(12) United States Patent
Lenchner et al.

(10) Patent No.: US 10,761,179 B2
(45) Date of Patent: *Sep. 1, 2020

(54) METHODS AND APPARATUS FOR LOCALIZING A SOURCE OF A SET OF RADIO SIGNALS

(71) Applicant: International Business Machines Corporation, Armonk, NY (US)

(72) Inventors: Jonathan Lenchner, North Salem, NY (US); John C. Nelson, Newtown, CT (US); Timo Juhani Santala, Port Washington, NY (US)

(73) Assignee: International Business Machines Corporation, Armonk, NY (US)

(*) Notice: Subject to any disclaimer, the term of this patent is extended or adjusted under 35 U.S.C. 154(b) by 39 days.

This patent is subject to a terminal disclaimer.

(21) Appl. No.: 14/750,219

(22) Filed: Jun. 25, 2015

(65) Prior Publication Data

US 2016/0283756 A1 Sep. 29, 2016

Related U.S. Application Data

(63) Continuation of application No. 14/668,215, filed on Mar. 25, 2015.

(51) Int. Cl.
*G01S 5/02* (2010.01)
*G01S 5/04* (2006.01)
*G06K 7/10* (2006.01)

(52) U.S. Cl.
CPC ............ *G01S 5/0252* (2013.01); *G01S 5/04* (2013.01); *G06K 7/10128* (2013.01)

(58) Field of Classification Search
CPC .................. G01S 5/0252; G06K 7/10128
(Continued)

(56) References Cited

U.S. PATENT DOCUMENTS 7,224,311 B2   5/2007   Tanygin et al.
8,405,551 B2   3/2013   Hido et al.
(Continued)

OTHER PUBLICATIONS

Song et al., "Monte Carlo Simultaneous Localization of Multiple Unknown Transient Radio Sources Using a Mobile Robot with a Directional Antenna", IEEE International Conference on Robotics and Automation, Kobe, Japan, 2009.
(Continued)

*Primary Examiner* — Emily C Terrell
(74) *Attorney, Agent, or Firm* — Ryan, Mason & Lewis, LLP

(57) ABSTRACT

Methods and apparatus are provided for localizing a source of a set of radio signals, such as radio signals received from an RFID tag at various locations. A source of a set of radio signals (such as radio signals received from an RFID tag at various locations) is localized by obtaining a plurality of radio signals in the set from a different location in an environment; determining a magnitude and received location for each of the plurality of radio signals; determining a direction for each of the plurality of radio signals by comparing each given radio signal to other radio signals in the set; and determining a location of the source of the set of radio signals by determining an intersection of the direction for each of the plurality of radio signals. The direction for each of the plurality of radio signals optionally comprises a net directional vector determined using a weighted circular mean.

8 Claims, 9 Drawing Sheets

```
                                                                              ┌─ 800
// Exemplary technique for determining nodes inside arc uses a flood-fill technique
// Where first it is seeded with a point contained inside of arc
// Verify each point by ensuring angle between signal point and node in question angle is within bounds
// Remove individual verification step of each possible node
public Tag CalculateLocation(Tag readings) { for(Map.Entry<String,SSLocation> entry : readings.foundSignalLocations.entrySet()) {

// Grab one signal
        SSLocation currentSignal = entry.getValue();

// Make sure this direction was set. If not, throw it out
        if(!currentSignal.isDirectionSet()) {
            continue;
        }

// Grab the seedNode, or node along vector but contained within the arc
        DPoint seedNode = GetSeedPoint(currentSignal);

if(seedNode == null) {// Should never occur, but that's fine
            continue;
        }
```

(58) Field of Classification Search
USPC .................................................... 340/10.1
See application file for complete search history.

(56) References Cited

U.S. PATENT DOCUMENTS

| | | | |
|---|---|---|---|
| 8,659,430 | B2 | 2/2014 | Bloy et al. |
| 8,843,155 | B2 | 9/2014 | Burton et al. |
| 8,989,774 | B2* | 3/2015 | Li .................... H04W 4/043 |
| | | | 455/456.1 |
| 9,316,719 | B1* | 4/2016 | Sternowski ........... G01S 5/0252 |
| 2003/0122666 | A1* | 7/2003 | John .................... G08G 5/0082 |
| | | | 340/539.13 |
| 2004/0160364 | A1 | 8/2004 | Regev |
| 2008/0143482 | A1* | 6/2008 | Shoarinejad ............ G01S 7/003 |
| | | | 340/10.1 |
| 2008/0250869 | A1* | 10/2008 | Breed .................... B60C 11/24 |
| | | | 73/861.27 |
| 2009/0212921 | A1* | 8/2009 | Wild .................... G01S 13/756 |
| | | | 340/10.5 |
| 2009/0303005 | A1* | 12/2009 | Tuttle .................... H04Q 9/00 |
| | | | 340/10.1 |
| 2012/0062381 | A1* | 3/2012 | Liu ........................ G01S 11/06 |
| | | | 340/572.1 |
| 2012/0194387 | A1 | 8/2012 | Faragher |
| 2012/0293371 | A1 | 11/2012 | Lu |
| 2013/0207844 | A1 | 8/2013 | Lee et al. |
| 2014/0049428 | A1 | 2/2014 | Nguyen |
| 2014/0077999 | A1* | 3/2014 | Jeong ........................ G01S 5/04 |
| | | | 342/463 |
| 2014/0266609 | A1* | 9/2014 | Yang .................. G06K 7/10366 |
| | | | 340/8.1 |
| 2015/0186693 | A1* | 7/2015 | Blair .................. G06Q 10/0833 |
| | | | 340/10.1 |

OTHER PUBLICATIONS

Movahhedi et al., "A Novel Approach to Radio Direction Finding and Detecting the Number of Sources Simultaneously: DMSAE Algorithm", 34th European Microwave Conference, Amsterdam, 2004.

Talampas et al., "Geometry-based Algorithms for Device-free Localization with Wireless Sensor Networks", 2014 IEEE Ninth International Conference on Intelligent Sensors, Sensor Networks and Information Processing, Singapore, 2014.

Parashar et al., "Noisy Distance Measurements Using 3-D Localization with Rb-Rf Methods", Cornell University Library, 2014.

* cited by examiner

```
// Exemplary technique for determining nodes inside arc uses a flood-fill technique
// Where first it is seeded with a point contained inside of arc
// Verify each point by ensuring angle between signal point and node in question angle is within bounds
// Remove individual verification step of each possible node
public Tag CalculateLocation(Tag readings) { for(Map.Entry<String,SSLocation> entry : readings.foundSignalLocations.entrySet()) {

// Grab one signal
        SSLocation currentSignal = entry.getValue();

// Make sure this direction was set. If not, throw it out
        if(!currentSignal.isDirectionSet()) {
            continue;
        }

// Grab the seedNode, or node along vector but contained within the arc
        DPoint seedNode = GetSeedPoint(currentSignal);

if(seedNode == null) {// Should never occur, but that's fine
            continue;
        }
```

FIG. 8B

```
// Weaker signals (e.g., higher RSSI value) are more prevalent, so reduce significance
// For a strong centerSignal, weight or give more votes to this centerSignal
int votes = calculateIntersectionWeighting(currentSignal);

// Below is a standard flood fill technique
// http://en.wikipedia.org/wiki/Flood_fill -- provides animations showing concept
_openSet.clear();
_closedSet.clear();
_openSet.put(seedNode.x + "," + seedNode.y,seedNode);
while(!_openSet.isEmpty()) {//checks if hashmap is empty //pop off item from open set
    DPoint currentNode = null;
    for(String openKey : _openSet.keySet()) {
        currentNode = _openSet.get(openKey);
        _openSet.remove(openKey);
        break;
    } if(currentNode == null) break; // check for error

// check if popped point is contained if(!isNodeContainedInArc(currentSignal,currentNode)) {
        continue;
    }
```

```
CheckNeighbors(currentNode);

// Add intersection value. Here is where the WeightFro
String nodeAsString = currentNode.x + "," + currentNode.y;
        if(!_IntersectionMap.containsKey(nodeAsString))
        _IntersectionMap.put(nodeAsString, votes);
else
        _IntersectionMap.put(nodeAsString, IntersectionMap.get(nodeAsString) + votes);

// Add it to the closed set to make sure it doesn't get re-added
_closedSet.put(nodeAsString, currentNode);
} if(!_IntersectionMap.isEmpty()) {

// Now, find point of maximum intersection by iterating through map
// Can further expand this to take analyze the 'shape' of the peak generated
// --> for example, if peak is wider, then 'confidence' is lower
// --> but if peak is narrow, 'confidence' is higher
DPoint result = FindMaximumOfIntersectionMap();

readings.estimatedLocation.setX(result.x);
readings.estimatedLocation.setY(result.y);
//System.out.println(readings.groupCode + "," + readings.serialNumber + "has location of" +
        result.x + "," + result.y);
readings.CalculateConfidence();
} return readings;
}
```

METHODS AND APPARATUS FOR LOCALIZING A SOURCE OF A SET OF RADIO SIGNALS

CROSS-REFERENCE TO RELATED APPLICATIONS

This application is a continuation of U.S. patent application Ser. No. 14/668,215, filed Mar. 25, 2015, incorporated by reference herein.

FIELD OF THE INVENTION

Embodiments of the invention generally relate to information technology, and, more particularly, to techniques for localizing a source of a set of radio signals.

BACKGROUND

Data centers are facilities used to house computer systems and related devices, such as power supplies, communications and storage systems, environmental controls (such as air conditioning and fire suppression) and various security devices. A number of techniques have been proposed or suggested for automatically navigating, mapping and/or monitoring data centers. For example, J. Lenchner et al., "Towards Data Center Self-Diagnosis Using a Mobile Robot," ACM Int'l Conf. on Autonomic Computing (ICAC '11) (2011), incorporated by reference herein, discloses a robot that serves as a physical autonomic element to automatically navigate, map and monitor data centers. The disclosed robot navigates a data center, mapping its layout and monitoring its temperature and other quantities of interest with little, if any, human assistance. In addition, U.S. patent application Ser. No. 13/348,846, filed Jan. 12, 2012 (now U.S. Pat. No. 9,606,542), entitled "Discovery and Monitoring of an Environment Using a Plurality of Robots," incorporated by reference herein, discloses techniques for coordinating multiple mobile robots for exploring and monitoring a given environment or region.

Radio Frequency IDentification Identification (RFID) tags are often used in numerous industrial applications as a method for ready identification of a given asset. An asset is first tagged with a given RFID tag and the association is commonly stored in an asset database. Typically, active RFID tags broadcast their respective serial number on a periodic basis and a receiver then records the received serial number along with the signal strength of the received signal and the location at which the signal was received. While RFID tags have greatly improved the ability to readily track equipment, they suffer from a number of limitations, which if overcome, could further extend the utility and efficiency of systems that either automatically or semi-automatically track equipment. Localizing the assets to a desired granularity is often quite difficult due to, for example, multipath propagation of signals and directional interference.

A need therefore remains for improved techniques for localizing a source of a set of radio signals, such as radio signals received from an RFID tag at various locations.

SUMMARY

In one aspect of the present invention, methods and apparatus are provided for localizing a source of a set of radio signals, such as radio signals received from an RFID tag at various locations. An exemplary computer implemented method for localizing a source of a set of radio signals (such as radio signals received from an RFID tag at various locations) comprises the steps of obtaining a plurality of radio signals in the set from a different location in an environment, wherein each of the plurality of radio signals is transmitted by the source; determining a magnitude and received location for each of the plurality of radio signals; determining a direction for each of the plurality of radio signals by comparing each given radio signal to other radio signals in the set; and determining a location of the source of the set of radio signals by determining an intersection of the direction for each of the plurality of radio signals, wherein at least one of the steps are performed by at least one hardware device.

In one exemplary implementation, the direction for each of the plurality of radio signals comprises a net directional vector that is determined using a weighted circular mean. The location of the source of the set of radio signals can be determined, for example, by identifying an intersection of the net directional vector for each of the plurality of radio signals.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 8A through 8C, collectively, comprise exemplary pseudo code for performing the exemplary asset tracking process of FIG. 2.

DETAILED DESCRIPTION

Aspects of the present invention provide methods, apparatus and computer program products that localize a source of a set of radio signals, such as radio signals received from an RFID tag at various locations. While an exemplary embodiment of the present invention is illustrated using the localization of equipment in data centers using RFID signals, the present invention can be applied to any electromagnetic signal distribution mechanism where the location and received signal strength are recorded, as would be apparent to a person of ordinary skill in the art.

The term "building," as used herein, is intended to refer to a variety of facilities, including, but not limited to, data centers hosting large amounts of information technology (IT) equipment, as well as industrial office space and residential buildings.

Figure 1:
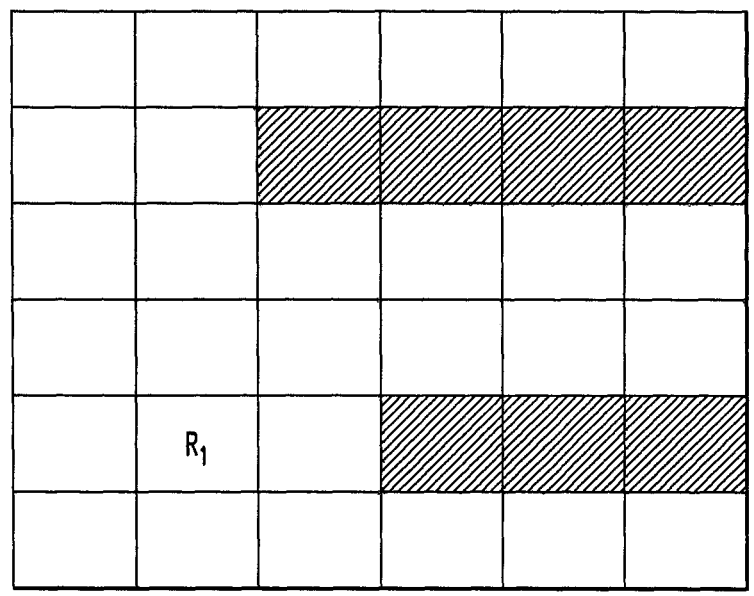
FIG. 1 illustrates an exemplary indoor environment in which the present invention can be employed.

FIG. 1 illustrates an exemplary indoor environment 100 in which the present invention can be employed. Let one or more robots {$R_1$, . . . , $R_k$} be given and suppose that the space to be explored within the exemplary indoor environment 100 has been discretized into a set of square "tiles." In some practical environments, such as computer data centers, the natural discretization unit is in fact a physical floor or ceiling tile. In other environments, the discretization unit may be virtual tiles. The exemplary indoor environment 100 of FIG. 1 comprises an exemplary array of 6-by-6 tiles, being explored by one exemplary robot $R_1$. Tiles filled with a cross-hatched pattern indicate the presence of obstacles. As discussed further below, the exemplary robot $R_1$ navigates through the exemplary indoor environment 100 and records received serial numbers from one or more RFID tags along with the strength of the received signal and location of the robot when the signal was received.

For a detailed discussion of suitable exemplary robots, see, for example, U.S. patent application Ser. No. 12/892,532, filed Sep. 28, 2010, entitled "Detecting Energy and Environmental Leaks in Indoor Environments Using a Mobile Robot," incorporated by reference herein. The term "robot," as used herein, refers generally to any form of mobile electro-mechanical device that can be controlled by electronic or computer programming. In this basic form, as will be described in detail below, the exemplary robots move throughout the designated portions of the exemplary indoor environment 100 and take signal measurements as well as positioning data (so as to permit the signal strength data to be associated with a given position in the building 100). The robots should be capable of moving in various directions along the floor of the building, so as to navigate where the robots need to go and to maneuver around obstacles, such as equipment, furniture, walls, etc., in the building 100.

It is preferable that the exemplary robot (e.g., $R_1$) have the capability to collect and store the data, i.e., serial number, signal strength and positioning data, to allow for analysis at a later time though it is also possible that the data be streamed to a controlling or server computer where the data may be processed and/or stored. As discussed hereinafter, the exemplary indoor environment 100 can be a known or unknown environment.

Aspects of the present invention recognize that RF signal strength does not monotonically decrease with distance from the RFID tag. In fact, RFID tags can exhibit variable signal strength profiles when measured from precisely the same location in the exemplary indoor environment 100 at different times. In addition, indoor environments, such as the exemplary indoor environment 100, typically suffer from multi-pathing issues, especially in the presence of metal surfaces.

It can be shown that due to interference, impedance effects can cause a signal to appear to have originated further from a point of detection than the actual location. Non-monotonicity manifests itself due to a variable amount of interference. In addition, RF signal strengths are not consistent from tag to tag. For example, assume that a first tag is placed at a given location (x,y) and that its signal strength (as measured by the Received Signal Strength Indication, or RSSI, an integer-valued indicator of signal strength that decreases with increasing signal strength, though the exact manner and calibration of this decrease may vary by manufacturer) is then sampled from 10 other locations. A second tag may then be placed at the same location as the first tag, and RSSI readings taken at the same locations from which the first tag was measured. The first tag may have a RSSI distribution from 60 (strong) to 75 (weak) while the second tag may have a RSSI distribution of 70 (strong) to 90 (weak). Thus, the first tag's calibration, or correlation of RSSI to a distance, may not be consistent with that of the second tag.

Further, range specific models, to the extent that they have some applicability, inherently require range calibration or an initial sampling of data to get a characteristic function relating signal strength to estimated distance from the source of the signal.

One exemplary embodiment of the invention assumes that a signal map is provided, which plots the strength of a signal at various locations around the exemplary indoor environment 100. In one exemplary implementation, the exemplary robot $R_1$ is outfitted with an RFCode active RFID reader that fuses the beaconing signals with the current location of the robot $R_1$. In an alternative implementation, a reader could be moved around an environment, leaving the reader in various locations for a minimum beacon interval, then moving the reader to another location until a signal map is obtained.

Figure 2:
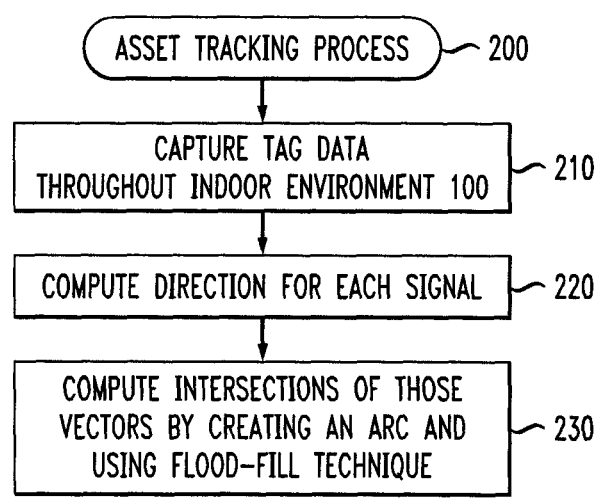
FIG. 2 is a flow chart illustrating an exemplary asset tracking process incorporating aspects of the present invention.

FIG. 2 is a flow chart illustrating an exemplary asset tracking process 200 incorporating aspects of the present invention. Generally, the exemplary asset tracking process 200 compares each measured signal of a given RFID tag to every other signal from the given RFID tag to determine a "direction" inferred by each measured signal. In this manner, the exemplary asset tracking process 200 determines trends in the location of each measured signal and infers the "direction" of each measured signal.

In one exemplary embodiment, stronger signals are given more weight in computing the direction than weaker signals. Once directions for each measured signal for the given RFID tag are computed, angular arcs are projected. The intersection of the arcs is the estimated location of the given RFID tag.

As shown in FIG. 2, the exemplary asset tracking process 200 initially captures tag data throughout the indoor environment 100 during step 210, as discussed further below in conjuction with FIG. 3. In one exemplary implementation, the data is captured using a robot $R_1$ during a routine exploration. The exemplary data is filtered for a given RFID tag (by serial number) and comprises position information (e.g., X, Y) and signal strength (often reported as RSSI). As noted above, a lower RSSI value indicates a stronger signal.

Thereafter, the exemplary asset tracking process 200 computes the direction for each measured signal during step 220, as discussed further below in conjuction with FIGS. 4 and 5. In this manner, for every signal received from a given tag, a directional component is computed based on all other measured signals for the given tag using a weighted circular mean.

The uncertainty associated with these vectors gives rise to an arc during step 230 and the intersection among the respective arcs is computed using a flood-fill technique, as discussed further below in conjunction with FIGS. 6 and 7. For example, after every directional component is computed for each signal received from a tag, an arc is then created that is +/−x degrees about that directional component, where the magnitude of x may, for example, be taken to be inversely proportional to the standard deviation of the signal strengths used to determine the unit directional vector, or, alternatively, to some fixed value.

The exemplary flood-fill technique discretizes the map into a rectangular grid of n equally spaced nodes. The spacing of the nodes is determined by the required resolution of the approximation. To improve accuracy, the node size can be decreased thereby increasing the number of nodes at the cost of additional computation time. The nodes contained inside each of these arcs are identified by using an exemplary seeding and flood-filling technique. Once these nodes are identified, they are given a weight based on the strength of the signal in question.

In one exemplary embodiment, the approximation is improved using the layout obtained by or known to the robot $R_1$, for example, to localize the tag to the nearest object or closest front-of-rack. The node on the map with the maximum number of intersecting arcs nearest to the closest front-of-rack is then the estimated location of the tag.

Figure 3:
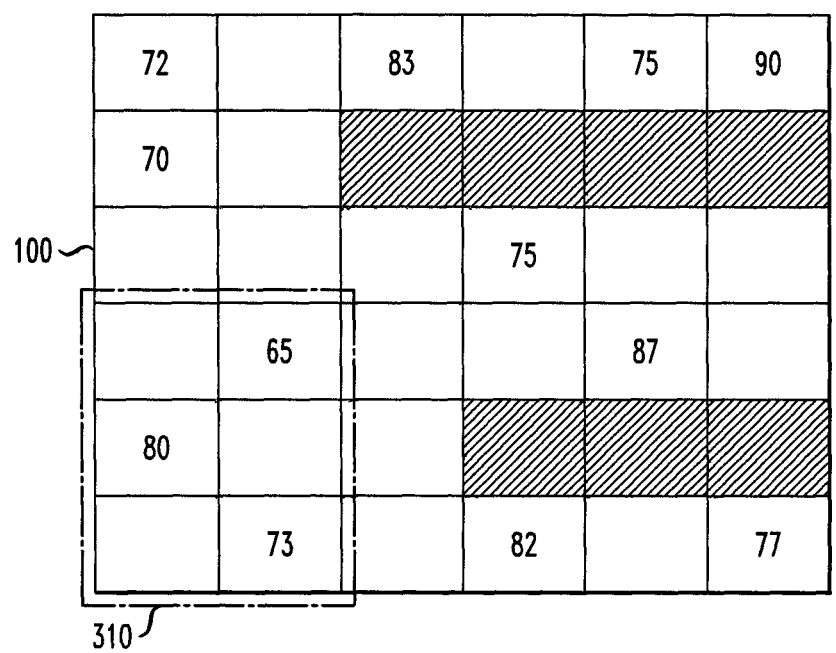
FIG. 3 illustrates a signal strength map comprising a plurality of signal strength measurements obtained from a particular RFID tag at various locations in the exemplary indoor environment of FIG. 1.

FIG. 3 illustrates a signal strength map 300 comprising a plurality of signal strength measurements obtained from a particular RFID tag at various locations in the exemplary indoor environment 100 of FIG. 1. As previously noted, the exemplary signal strength map 300 is generated by an autonomous data center robot $R_1$ having an RFID reader. In the exemplary embodiment, lower RSSI values indicate stronger RFID signals (i.e., a value of 60 is stronger than a value of 80). The exemplary asset tracking process 200 processes the signal strength map 300 to localize the given RFID tag. The signal strength map 300 comprises a subset 310 of the signal strength measurements that is discussed further below in conjunction with FIG. 4, for a particular region of the exemplary indoor environment 100.

Figure 4:
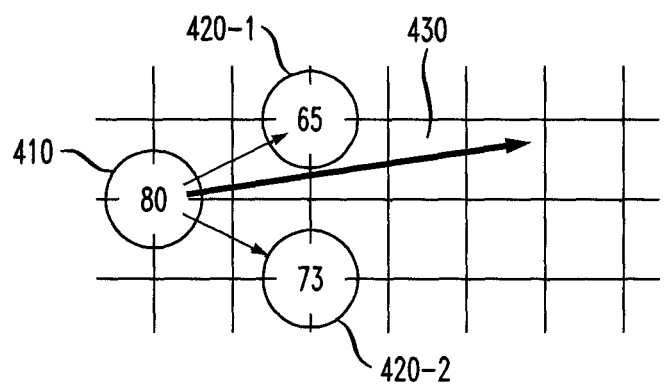
FIG. 4 illustrates an exemplary processing of an exemplary subset of the signal strength measurements shown in FIG. 3.

FIG. 4 illustrates an exemplary processing of the subset 310 of the signal strength measurements shown in FIG. 3. As shown in FIG. 4, the subset 310 of the signal strength measurements comprises an exemplary node at which the system has received a signal for a given tag and at which the system needs to compute a directional vector. This node is referred to herein as the SIGNAL-TO-COMPUTE-VECTOR-FOR 410. At SIGNAL-TO-COMPUTE-VECTOR-FOR 410, the robot $R_1$ has received an exemplary signal strength measurement of 80. It has also received two additional signals from the same tag in the immediate vicinity, referred to as ADDITIONAL-SIGNAL_1, 420-1, and ADDITIONAL-SIGNAL_2, 420-2, having exemplary signal strength measurements of 65 and 73, respectively. The exemplary SIGNAL-TO-COMPUTE-VECTOR-FOR 410 is the current signal whose net directional vector is being computed. The exemplary ADDITIONAL-SIGNAL_i's (e.g., 420-1 and 420-2) are the signals that are compared to the SIGNAL-TO-COMPUTE-VECTOR-FOR 410. As previously mentioned, the value of 80 is the "weakest" signal. This algorithm will then only compare a SIGNAL-TO-COMPUTE-VECTOR-FOR to stronger signals (which generally have less error).

It is noted that the two ADDITIONAL-SIGNAL_is 420-1 and 420-2, are approximately equally spaced from the exemplary SIGNAL-TO-COMPUTE-VECTOR-FOR 410. Thus, if equal weighting were applied, a net direction vector 430 for the exemplary SIGNAL-TO-COMPUTE-VECTOR-FOR 410 would point along the +x axis, from the weaker signal to the stronger signal. Generally, the exemplary embodiment employs a weighting where the higher the difference between the SIGNAL-TO-COMPUTE-VECTOR-FOR 410 and a given ADDITIONAL-SIGNAL_i 420, the greater the influence on the net direction vector 430. For example, since the difference between the exemplary ADDITIONAL-SIGNAL_1 420-1 and the exemplary SIGNAL-TO-COMPUTE-VECTOR-FOR 410 is greater than the difference between the exemplary ADDITIONAL-SIGNAL_2 420-2 and the exemplary SIGNAL-TO-COMPUTE-VECTOR-FOR 410, the vector between the exemplary ADDITIONAL-SIGNAL_1 420-1 and the exemplary SIGNAL-TO-COMPUTE-VECTOR-FOR 410 has more influence on the net direction vector 430. Note, when evaluating each signal, only the signals that are stronger than the exemplary SIGNAL-TO-COMPUTE-VECTOR-FOR 410 are considered in the exemplary implementation, as opposed to the weaker signals. This is due to the fact that weaker signals are generally more prevalent and can overly influence the computed net direction. Furthermore, weaker signals may contain a significantly larger amount of error due to multipathing issues and general signal impedance.

The net directional vector 430 is computed for each measured signal in comparison to all other received stronger signals for a given RFID tag. In the exemplary embodiment, a weighted circular mean is computed using the following equation:

$$\bar{a} = a \tan 2((\Sigma_{j=1}^{n} \sin(a)_j * w_j) * (\Sigma_{j=1}^{n} \cos(a)_j * w_j))$$

It is noted that a tan 2(y component, x component) is a standard two-value arctan function that returns an angle in the appropriate quadrant of a unit circle (see, e.g., http://en.wikipedia.org/wiki/Atan2). The variable $\bar{a}$ is the resultant angle for a given signal location that corresponds to the net directional vector 430 of interest. The variable $a_j$ is an angle between the SIGNAL-TO-COMPUTE-VECTOR-FOR 410 (the center of a hypothetical circle) and a particular ADDITIONAL-SIGNAL_j, 420-1 or 420-2. The variable $a_j$ is obtained by computing a tan 2(ADDITIONAL-SIGNAL_j.y−SIGNAL-TO-COMPUTE-VECTOR-FOR.y, ADDITIONAL-SIGNAL_j.x−SIGNAL-TO-COMPUTE-VECTOR-FOR.x).

The variable $w_j$ is a weight computed by obtaining the difference between the SIGNAL-TO-COMPUTE-VECTOR-FOR 410 and a particular ADDITIONAL-SIGNAL_i 420. Generally, small differences correspond to a low weight (because small differences provide little information).

For a given RFID measured signal (SIGNAL-TO-COMPUTE-VECTOR-FOR 410), iterate through all of the other measured signals (ADDITIONAL-SIGNAL_j 420), computing the value $a_j$ for each ADDITIONAL-SIGNAL_j 420. When the value $a_j$ is computed for a SIGNAL-TO-COMPUTE-VECTOR-FOR 410 and ADDITIONAL-SIGNAL_j 420, the weight $w_j$ is also computed for that pair of signals and the results are fed into the above equation for $\bar{a}$, thus obtaining the circular mean.

Figure 5:
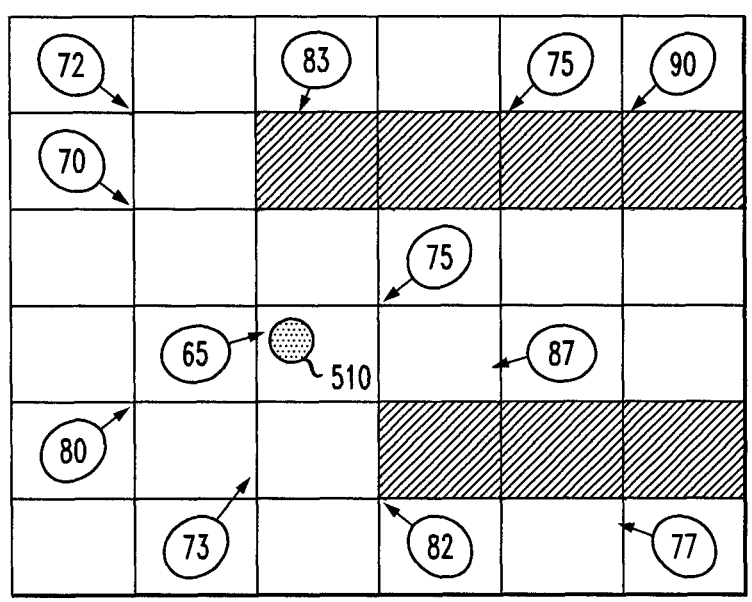
FIG. 5 illustrates a vector field of the signal strength measurements obtained from a particular RFID tag in the exemplary indoor environment of FIG. 1.

FIG. 5 illustrates an exemplary vector field 500 of the signal strength measurements obtained from a particular RFID tag in the exemplary indoor environment 100 of FIG. 1. The pointer associated with each measured signal is based on an inferred "direction" determined from each measured signal. It is noted that not all pointers point directly at the estimated tag location 510. In this manner, from every measured signal, the direction of a given RFID tag is estimated. The exception to this case is the strongest measured signal since there are no stronger signals to compare it to. Since all other vectors are based off of the strongest signal, the vector of the strongest signal can be omitted.

Figure 6:
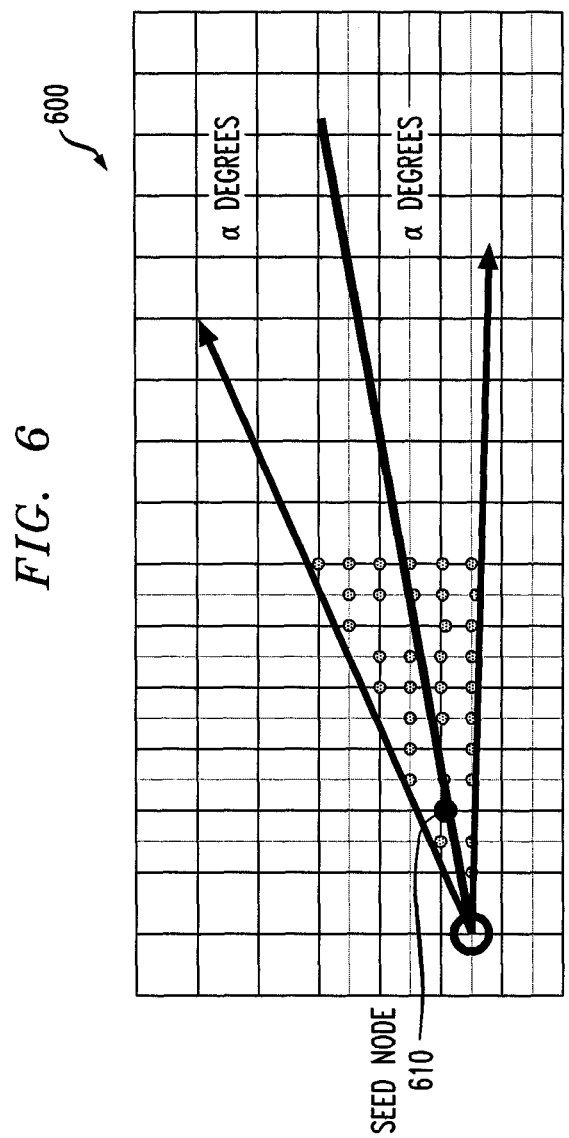
FIG. 6 illustrates an exemplary computation of the intersection of the arcs in accordance with an exemplary flood-fill technique.
Figure 7:
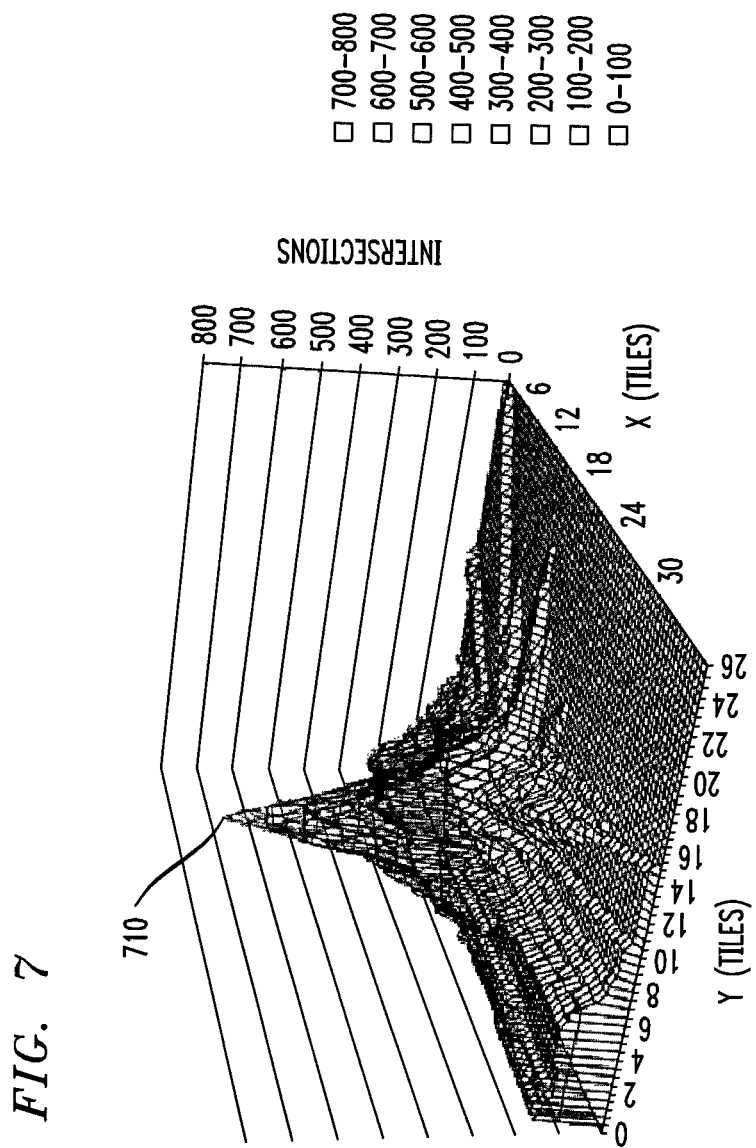
FIG. 7 illustrates a determination of the location of a particular RFID tag based on the intersection of the arcs of FIG. 6.

The consensus pointing direction and location of the vectors in the vector field 500 are computed during step 230 of the exemplary asset tracking process 200 by creating an arc from the vectors and using a flood-fill technique, as shown in FIGS. 6 and 7. Rather than calculating the intersection of rays, the exemplary embodiment treats each vector as an arc and finds all of the nodes contained in those arcs. Arcs are used to accomodate uncertainty in the measurements i.e., in one embodiment the fewer the number of signals used to determine the net direction vector results, the wider the arc.

FIG. 6 illustrates an exemplary computation of the consensus pointing direction and estimated location of the beaconing RFID tag in accordance with an exemplary flood-fill technique. As shown in FIG. 6, the exemplary flood-fill technique starts with a seed node 610 selected along the direction of the net direction vector 430 or a node that is contained in the arc and then evaluates all connected child nodes contained in the arc. The variable $\alpha$ may be taken to be a constant (e.g., 20 degrees) but may also vary, as previously noted, based on the uncertainty in the measurements giving rise to a particular arc.

The arc is defined by the +/- alpha degrees about the net direction vector 430 as previously calculated. Then, starting from a node contained in the arc, iterate through all of the child nodes testing each node for being contained in the arc. If the node is successfully in the arc, then the children of the node are also checked until this arc is completely filled and there are no more nodes to consider.

FIG. 7 illustrates the determination of the location of a particular RFID tag based on the intersection of the arcs of FIG. 6. Generally, after all of the arcs are computed and the number of intersections at each node has been summed, as discussed above in conjunction with FIG. 6, the point with the maximum number of intersections (i.e., peak 710) is the estimated location of the RFID tag. If there are multiple nodes that share the peak, then the centroid is the estimated location.

FIGS. 8A through 8C, collectively, comprise exemplary pseudo code 800, 820, 840 for performing the exemplary asset tracking process 200 of FIG. 2. Generally, the exemplary pseudo code 800, 820, 840 determines the nodes that are inside an arc using an exemplary flood-fill technique. As shown in FIG. 8A, the process is seeded with a point contained inside of the arc, and then verifies each point by ensuring that the angle between a signal point and a node in the question angle is within bounds. The individual verification step of each possible node is removed.

As shown in FIG. 8B, the process reduces the significance of weaker signals (e.g., higher RSSI value), since they are more prevalent. Strong SIGNAL-TO-COMPUTE-VECTOR-FOR signals 410 are given a higher weight (e.g., more votes). In addition, the exemplary flood-fill technique is initiated in FIG. 8B and concludes in FIG. 8C. The point of maximum intersection (see, FIG. 7) is found by iterating through the map 500 (FIG. 5). The "shape" of the peak 710 generated can be analyzed for additional information. For example, in one exemplary embodiment, if the peak 710 is wider, then a lower confidence score can be assigned. Likewise, if the peak 710 is more narrow, then a higher confidence score can be assigned.

Among other benefits, the exemplary asset tracking process 200 does not use range based estimation. In addition, the exemplary asset tracking process 200 can handle tags outside of the convex hull of the sampled region. Further, the exemplary asset tracking process 200 does not require pre-calibration, previously known data, a selective search pattern for a given tag, or pre-filtering of data.

The techniques depicted in FIGS. 2 and 8A-8C can also, as described herein, include providing a system, wherein the system includes distinct software modules, each of the distinct software modules being embodied on a tangible computer readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer readable recordable storage medium with code adapted to be executed to carry out at least one method step described herein, including the provision of the system with the distinct software modules.

Additionally, the techniques depicted in FIGS. 2 and 8A-8C can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 9:
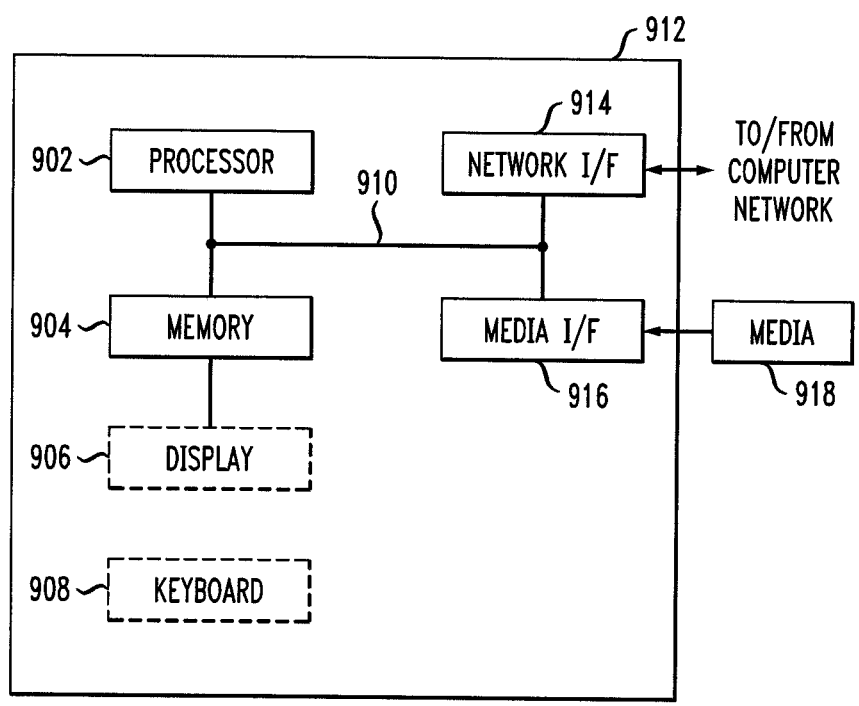
FIG. 9 is a system diagram of an exemplary computer system on which at least one embodiment of the invention can be implemented.

Additionally, an aspect of the present invention can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, controlling the activities of a system administrator or another user on an endpoint device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for localizing a source of a set of radio signals, the method comprising the steps of:
    obtaining a plurality of radio signals in said set by moving a signal reader to a plurality of locations in an environment, wherein each of said plurality of radio signals is transmitted by said source;
    determining one or more signal strengths of said radio signals, a location at which said plurality of radio signals are obtained, and an identifier of said source;
    determining a directional vector for each of said plurality of radio signals by comparing said one or more signal strengths to signal strengths of other radio signals in said set;
    projecting said determined directional vectors; and
    determining a location of said source of said set of radio signals using an intersection selection criterion that evaluates a number of said projected determined directional vectors that intersect for each of said plurality of radio signals, wherein at least one of said steps are performed by at least one hardware device.

2. The method of claim 1, wherein said set of radio signals comprises radio signals received from an RFID tag by moving said signal reader to said plurality of locations.

3. The method of claim 1, wherein said signal strength of each given radio signal in said set is proportional to a received signal strength at said corresponding received location of said environment.

4. The method of claim 1, wherein said signal strength of each of said plurality of radio signals in said set is proportional to a function of a received signal strength at said corresponding received location of said environment.

5. The method of claim 1, wherein said directional vector for each of said plurality of radio signals comprises a net directional vector.

6. The method of claim 5, wherein said net directional vector is determined using a weighted circular mean.

7. The method of claim 1, wherein said intersection is identified by creating one or more arcs and employing a flood-fill technique.

8. The method of claim 7, wherein said location of said source is identified by determining a substantially largest number of said intersections.

* * * * *